Figure 1:
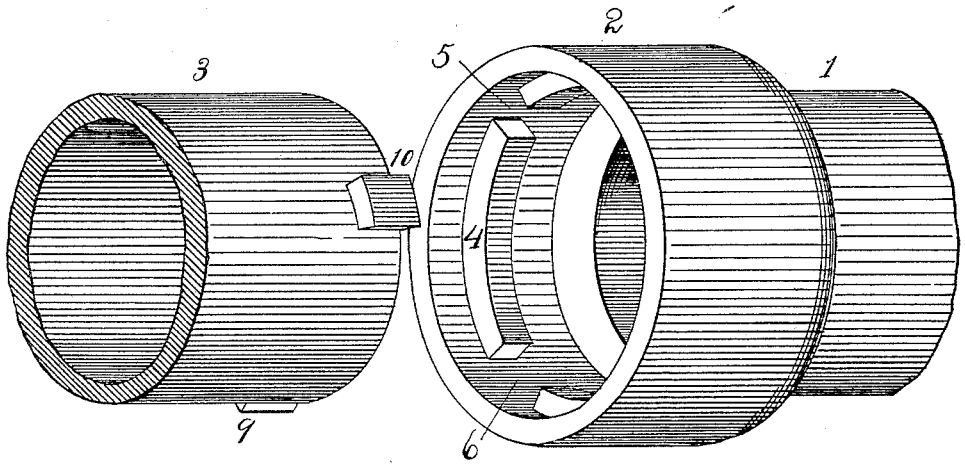

(No Model.)

J. P. COSTIGAN.
PIPE JOINT.

No. 437,915. Patented Oct. 7, 1890.

WITNESSES:

INVENTOR:
Joseph P. Costigan
BY _____, ATTORNEY.

THE NORRIS PETERS CO., PHOTO-LITHO., WASHINGTON, D. C.

UNITED STATES PATENT OFFICE.

JOSEPH PATRICK COSTIGAN, OF ST. PAUL, MINNESOTA, ASSIGNOR OF ONE-THIRD TO JOSEPH C. HENRY, OF SAME PLACE.

PIPE-JOINT.

SPECIFICATION forming part of Letters Patent No. 437,915, dated October 7, 1890.

Application filed November 19, 1889. Serial No. 330,923. (No model.)

*To all whom it may concern:*

Be it known that I, JOSEPH PATRICK COSTIGAN, a citizen of the United States, residing at St. Paul, in the county of Ramsey and State of Minnesota, have invented certain new and useful Improvements in Pipe-Joints; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention is especially applicable to such pipes as are commonly used for the conveyance of water or gas and the like, in which the adjacent pipe-sections are united by means of a bell and spigot joint.

The invention is a modification of the form of joint described in my application, Serial No. 305,902, filed April 2, 1889; and like that it consists in the improved form of the adjacent ends of the sections whereby they may be placed in position and retained relatively to each other without the assistance of calking or packing, whereby the apertures in any two adjacent sections are always concentric without the necessity of special adjustment for that purpose, whereby the strain of retaining the parts in relative longitudinal position shall be borne by the pipe-sections directly and not by the packing, whereby either section may be freely turned to any extent with reference to the other sections before calking without risk of uncoupling, and whereby the packing not only locks the sections, but is self-locking, thus making a perfectly-tight joint, and wholly preventing the separation of the sections by any strain, thus making the joint of as great strength as any part of the pipe, and in the detailed construction hereinafter more fully set forth.

The essential characteristic features of the construction of this invention are that the adjacent pipe-sections may be put together in any number and will remain in proper relative position longitudinally before packing, the latter not being essential to the retaining of the sections together, and when so placed the relative circumferential position of any section may be adjusted at will. It is often necessary in the case of a section carrying a branch that the position of the branch shall be capable of a nicety of adjustment with reference to a fixed section. In pipe-joints as commonly constructed such adjustment is limited to a certain number of predetermined positions. The feature of special importance in this construction is that the sections may be turned through the whole circle of three hundred and sixty degrees without disengagement, there being but one point at which the sections can be uncoupled.

The invention is illustrated in the accompanying drawings, in which—

Figure 2:
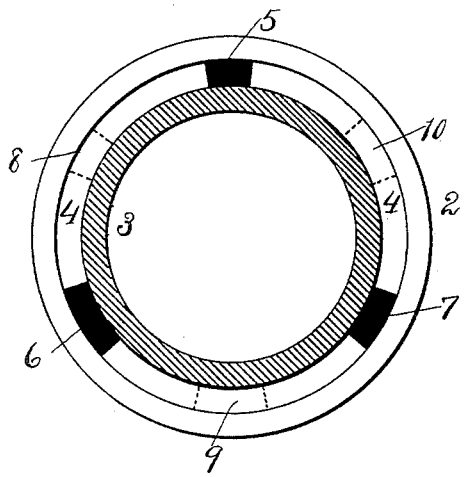

Figure 1 is a perspective view of the adjacent ends of two sections constructed in accordance with my improvement; and Fig. 2 is a cross-section of the entering section, showing the joint.

In the drawings, 1 represents the section provided with a bell 2, into which the end of the other section 3 is to be inserted. The interior of the bell is of somewhat larger diameter than the general outside diameter of the pipe, and about half-way from the inner to the outer end of the bell is provided a flange 4, extending around the interior and having its outer circumference of the same diameter or slightly greater diameter than that of the end of the adjacent section. The flange 4 is cut away in several places—three or more—as shown at 5, 6, and 7, the said openings being of varying width.

The end of the entering section 3 is provided with peripheral lugs 8, 9, and 10, corresponding in position and width with the openings 5, 6, and 7, respectively. When the entering section is so turned that its lugs will register with their corresponding openings, the lugs pass through the same, and being turned in either direction engage behind the flange, so that the two sections cannot be separated by any accidental displacement and must be turned through the whole three hundred and sixty degrees before they can be uncoupled. One section can thus be adjusted to any position with reference to the other while still retained immovable from longitudinal displacement. Moreover, the flange within the bell and the several lugs upon the end of the entering section co-operate to center the two sections, and no special adjustment for this purpose is required.

The joint is calked by pouring in melted lead or similar substance, the mouth of the bell being temporarily closed except at one point for this purpose. The calking material flows through the openings and around the lugs, filling the entire space on both sides of the flange except that occupied by the lugs, and also filling the openings, by which means the bodies of calking material on each side of the flange are united. The two sections are firmly locked in place, and the peculiar form assumed by the calking material prevents its displacement.

I claim as my invention—

1. In a joint for pipes, a pipe-section having a bell at one extremity, an annular flange within the bell, having openings of varying width therethrough, and a continuous annular space behind said flange, in combination with an entering pipe-section having exterior lugs corresponding in peripheral position and width with said openings, respectively, and adapted to pass through said openings and enter and turn axially within said annular space to any extent, substantially as set forth.

2. In a joint for pipes, a pipe-section having a bell at one extremity, an annular flange formed within said bell intermediate between the mouth of the bell and its bottom, whereby annular spaces are formed behind and in front of said flange, said flange having openings of varying width therethrough, in combination with an adjacent entering pipe-section having exterior lugs corresponding in peripheral position and width with said openings, respectively, and adapted to enter through said openings the annular space behind said flange, engage with the shoulder formed by said flange, and turn axially in said annular space to any extent, substantially as set forth, whereby when said pipe-sections are in a locked position communicating calking-spaces are formed around said entering pipe-section on both sides of said annular flange.

In testimony whereof I affix my signature in presence of two witnesses.

JOSEPH PATRICK COSTIGAN.

Witnesses:
WALLED HOLCOMB,
F. W. LANE.